(12) United States Patent
Harshaw

(10) Patent No.: US 6,542,871 B1
(45) Date of Patent: Apr. 1, 2003

(54) METHOD FOR NEW PRODUCT DEVELOPMENT AND MARKET INTRODUCTION

(76) Inventor: Bob F. Harshaw, 717 S. Main, Ottawa, KS (US) 66067

( * ) Notice: Subject to any disclaimer, the term of this patent is extended or adjusted under 35 U.S.C. 154(b) by 0 days.

(21) Appl. No.: 09/413,135

(22) Filed: Oct. 6, 1999

(51) Int. Cl.$^7$ .............................................. G06F 17/60
(52) U.S. Cl. ............................................. 705/7; 705/1
(58) Field of Search ........................................ 705/7, 1

(56) References Cited

U.S. PATENT DOCUMENTS

| | | | | |
|---|---|---|---|---|
| 3,850,433 | A | * 11/1974 | Purlia ......................... | 273/256 |
| 5,208,765 | A | * 5/1993 | Turnbull ...................... | 705/10 |
| 6,044,354 | A | * 3/2000 | Asplen, Jr. ................... | 705/7 |
| 6,298,327 | B1 | * 10/2001 | Hunter et al. ................. | 705/1 |
| 2002/0004775 | A1 | * 1/2002 | Kossovsky et al. ............ | 705/35 |

FOREIGN PATENT DOCUMENTS

| | | | |
|---|---|---|---|
| EP | 467584 A2 | * 1/1992 | G07C/3/00 |

OTHER PUBLICATIONS

Garage Technology Ventures [online], [retrieved on Jan. 10, 2002]. Retrieved from the Internet: <URL: http://www.garage.com>.*

Think Tank [online], [retrieved on Jan. 10, 2002]. Retrieved from the Internet: <URL: http://www.thinktank.com>.*

Katalyst [online], [retrieved on Jan. 10, 2000]. Retrieved from the Internet: <URL: http://www.katalyst.com>.*

Aurora Funds [online], [retrieved on Jan. 10, 2002]. Retrieved from the Internet: <URL: http://www.aurorafunds.com>.*

Incubate.com [online], [retrieved on Jan. 10, 2002]. Retrieved from the Internet: <URL: http://www.incubate.com>.*

Iventurelab [online], [retrieved on Jan. 10, 2002]. Retrieved from the Internet: <URL: http://www.iventurelab.com>.*

Hayes, Susan. "The source 1993," Success, vol. 40 No. 6, Aug. 1993, pp. 37–40.*

Whiddon, Robert L. "Venture–backed IPO: Garage.com Swings Open IPO Door," Private Equity Week, Feb. 21, 2000.*

Eisman, Regina. "Remaking a Corporate Giant." Incentive, v166, May 1992, p. 57(5).*

DiEdoardo, Chris. "Professors' royalties protected by court." San Diego Daily Transcript, Oct. 6, 1997.*

GE—Submitted Ideas Program [online], [retrieved on Jun. 13, 2002]. Retrieved from the Internet: <URL: http://www.ge.com/subideas.htm>.*

Meehan, Robert H. "Programs that Foster Creativity." Personnel, v63, Feb. 1986.*

DeSouza, Glenn. "Royalty methods for intellectual property." Business Economics, v32, n2, p46(7), Apr. 1997.*

* cited by examiner

Primary Examiner—Kyle J. Choi
Assistant Examiner—Catherine M. Colón
(74) Attorney, Agent, or Firm—Dale J. Ream

(57) ABSTRACT

A method for developing new products for introduction into the marketplace comprises the steps of providing a plurality of pools with each pool serving as a repository for new product concepts, ideas, or partially developed products. Each pool receives a predetermined number of new product concepts for registration according to the predetermined subject matter associated with each pool. One new product concept is selected from each pool for further development. Each selected new product concept is engineered to optimize its intended utility function. A degree of proprietary protection is then acquired relative to the engineered concept. Having obtained proprietary protection for the selected new product concept, potential licensees for the new product are identified and pursued for the purpose of executing a licensing agreement whereby the licensee will be granted the right to manufacture and sell the selected new product in the marketplace in exchange for royalties on sales. Royalties on sales are distributed first to the submitter of the selected new product concept and, in smaller proportions, to the other pool submitters and pool manager.

6 Claims, 2 Drawing Sheets

METHOD FOR NEW PRODUCT DEVELOPMENT AND MARKET INTRODUCTION

BACKGROUND OF THE INVENTION

This invention relates to a unique method for selecting and developing new products for introduction into the marketplace.

Each year individuals and small businesses conceive of thousands of ideas or concepts for new products. Few of these new product ideas, however, are ever developed and brought into the marketplace. Consequently, few inventors ever realize any financial gain as a result of their inventions. There are a variety of reasons why so few new product ideas progress to ultimate market introduction. A significant barrier is the financial expense relative to new product development which includes evaluation of marketability, patentability, and technical feasibility. Additional expense is incurred relative to product design, proprietary protection of the intellectual property encompassing the product, prototype development, etc. Further, few inventors pursue development of their new product ideas because completion of the above mentioned steps does not guarantee success in the marketplace. Only the "best" new products are ultimately successful.

Therefore, it is desirable to have a method for new product development which increases the expectation of financial return and decreases the cost of product development to individual inventors. Further, it is desirable to have a method for new product development which provides financial return to all inventor participants even if only a single new product idea progresses to market introduction.

SUMMARY OF THE INVENTION

It is therefore a general object of this invention to provide a method for developing new products for introduction into the marketplace.

Another object of this invention is to provide a method, as aforesaid, for accumulating new product ideas in a pool.

Still another object of this invention is to provide a method, as aforesaid, for selecting a new product idea from the pool for further development and market introduction.

Yet another object of this invention is to provide a method, as aforesaid, for developing a selected new product idea through concept design engineering.

A further object of this invention is to provide a method, as aforesaid, for acquiring a degree of proprietary protection for the intellectual property which encompasses a selected new product idea.

A still further object of this invention is to provide a method, as aforesaid, for licensing the right to make, use, sell, and/or distribute a selected new product to a manufacturer.

A particular object of this invention is to provide a method, as aforesaid, for distributing royalty revenue generated from the licensing of the selected new product to the registrant of the selected idea, the registrants of non-selected ideas, and the pool manager.

Other objects and advantages of this invention will become apparent from the following description taken in connection with the accompanying drawings, wherein is set forth by way of illustration and example, an embodiment of this invention.

These objects are accomplished according to a method in which one or more pools or funds are established into which ideas, concepts, or partially developed products are registered by individual or small business registrants. Each pool receives new product ideas related to a particular technology area or patent classification. When a predetermined number of new product registrations has been received within a pool, the marketability, patentability, and technical feasibility are evaluated by a pool manager and at least one idea is selected, based on the evaluation, for product development and market introduction. Product development is funded by new idea registration fees.

The selected registration is developed through design engineering so as to optimally fulfill its utility function and market niche. When the selected registration has been fully developed into a viable new product, the intellectual property encompassing the invention may be legally protected by filing and prosecuting one or more United States or foreign patent applications.

Upon issuance of a patent relative to the selected registration, the right to make, use, sell, and/or distribute the product encompassed by the patent is licensed to a manufacturer for ultimate market introduction. The pool manager undertakes efforts to identify and market the new product to potential licensees. The rights granted by the license are given to a manufacturer in exchange for royalties on sales of the new product during the term of the patent. A portion of the royalties generated through product sales is distributed first to the owner of the patent covering the selected new product registration. A second portion of the royalties that is smaller than the first portion is equally distributed to the pool registrants whose new product ideas were not selected for further development and market introduction. A third portion of the royalties that is smaller than the first portion is distributed to the manager of the pool. Thus, while the party who initially registered the new product idea receives the largest portion of eventual royalty revenues, each registrant in the pool receives a portion as well over the term of the patent.

DESCRIPTION OF THE PREFERRED EMBODIMENT

Figure 1:
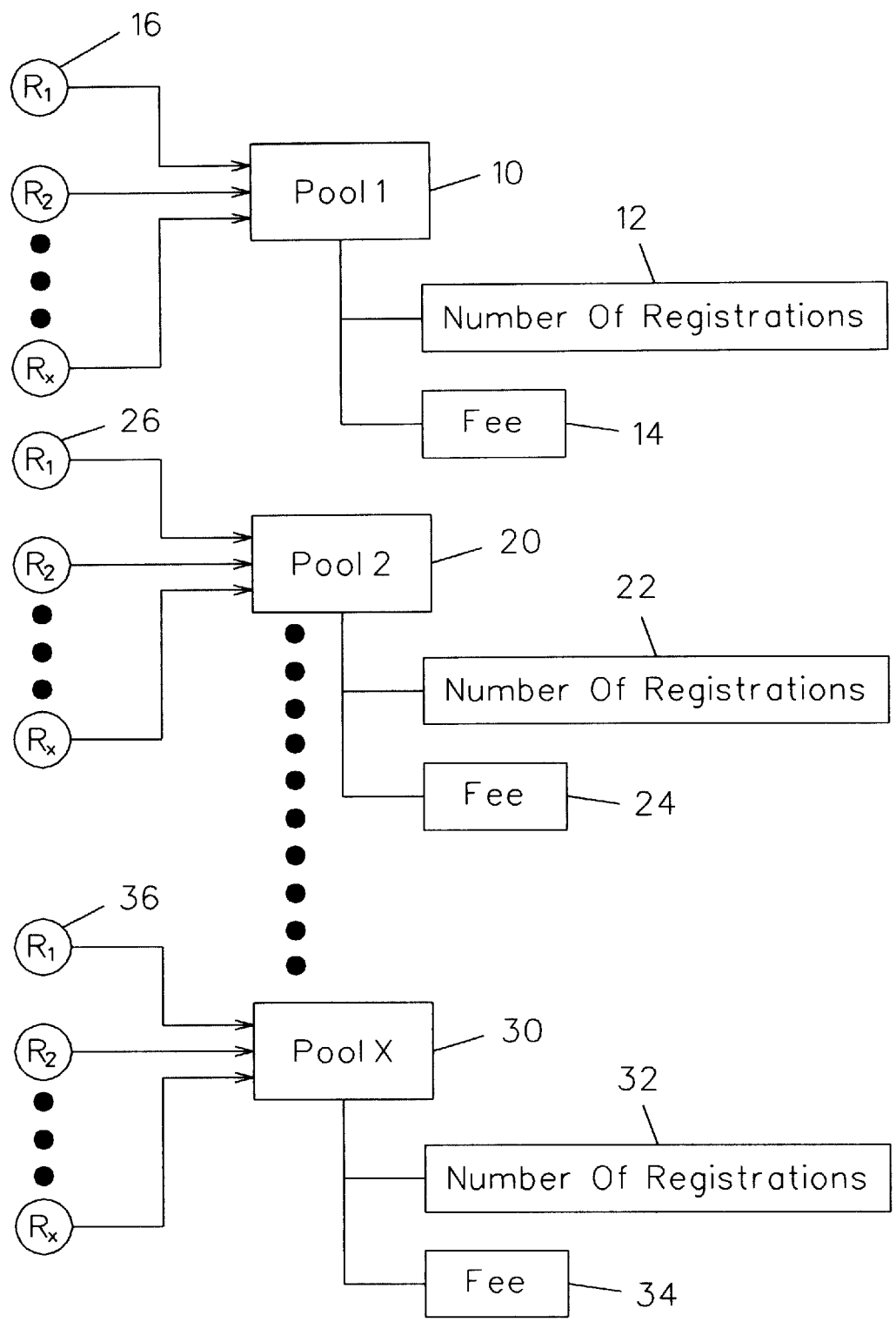
FIG. 1 is a block diagram showing a plurality of distinct pools into which new product ideas are registered.

Turning more particularly to the drawings, FIG. 1 shows the establishment of a plurality of pools 10, 20, 30 each pool being associated with a distinct subject matter, such as a general technology type or patent classification. Each pool 10, 20, 30 is a repository for new product ideas, concepts, or partially developed products which are related to the subject matter of the pool. As used herein, the term "product" includes any useful process, machine, manufacture, or composition of matter, and any useful improvement thereof. Individuals or small business registrants 16, 26, 36 having a new product idea may register the idea with the appropriate pool. New product ideas are preferably submitted electronically using a computer data processing system accessible through a wide area computer network, although ideas may also be submitted through traditional modes of communication such as mail or facsimile. Each registration includes at least a written description of the idea, concept, or partially developed product. Each pool 10, 20, 30 is managed by a pool manager 40 (FIG. 2) who will accept only legitimate new product ideas that are relevant to the subject matter of the pool.

Registration of new product ideas within each pool 10, 20, 30 is governed by a set of parameters that are predetermined by the pool manager 40. Pool parameters include, but are not limited to, the minimum number of registrations 12, 22, 32 that must be received into the pool and the fees 14, 24, 34 charged to a registrant upon registration. Since the registration fees 14, 24, 34 will be used to fund later product development, as to be described below, a pool remains "open" until the minimum number of registrations are received. Further, the amount of the registration fee is variable based upon the particular subject matter of the pool and the corresponding estimated cost of product development. If a pool remains open longer than a predetermined amount of time, the pool manager may selectively terminate the pool and refund all registration fees, extend the period of time to receive the predetermined number of registrations, or merge the pool with another pool such that the predetermined number of registrations is satisfied.

When a pool has accepted the predetermined number of registrations and is therefore "closed", one registered new product idea is selected for further development and market introduction. This selection is denoted as $R_y$ 50 in FIG. 2. In selecting an idea for further development, all ideas in the pool are analyzed relative to marketability, patentability, and technical feasibility. These analytical factors serve to identify the new product idea that, upon further development, will produce the most successful new product to introduce into the marketplace.

Once an idea has been selected ($R_y$) for further development, all registrants are notified of the selection. This notification is general in nature as the details of the selected new product idea are confidential pending proprietary protection therefor. The registrant of the selected idea 50, however, is notified more specifically and is consulted by the pool manager 40 during the development process.

Figure 2:
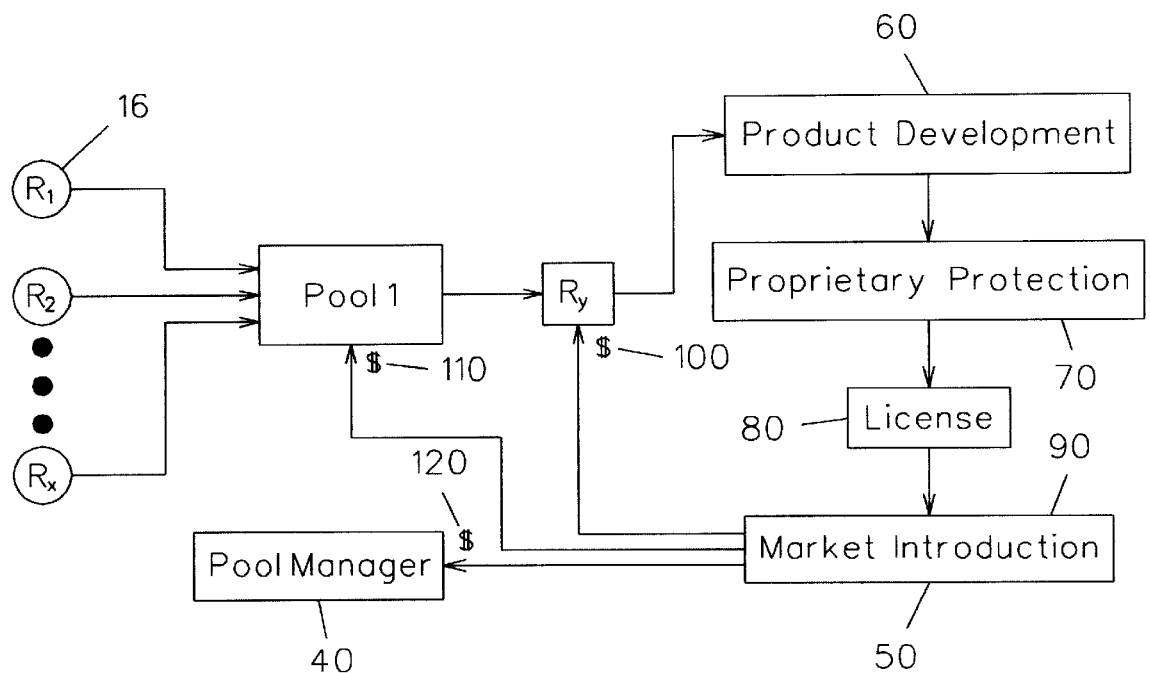
FIG. 2 is a block diagram illustrating the development and market introduction of a new product idea selected from a pool.

Using innovative design and engineering methods, the selected idea 50 is optimized to satisfy the specific utility function of the product while maintaining the marketability thereof, as denoted by reference number 60 in FIG. 2. With the invention fully defined, the next step in the development process is to acquire a degree of proprietary protection 70 for the intellectual property which encompasses the selected idea 50. Acquisition of proprietary protection 70 may entail the preparation, filing, and prosecution of at least one United States or foreign patent application relative to the selected idea 50. Trademarks relative to the selected idea 50 may also be acquired. The selected idea 50 is thus transformed from a mere product idea in a pool of many ideas, into a developed new product or product idea suitable for introduction into the marketplace with a degree of proprietary protection.

Once a satisfactory degree of proprietary protection is obtained, the selected idea 50 is licensed 80 to a manufacturer. The manufacturer will be granted the right to make, use, sell, and distribute the selected new product in a specified geographic territory. Accordingly, the selected product 50 will be introduced into the marketplace, as denoted by reference number 90 in FIG. 2. The license will require the manufacturer (i.e. the licensee) to pay royalties, which may be in the form of a single lump sum payment or a series of payments over time, in exchange for the right to commercialize the selected product 50. A first portion 100 of the royalties (e.g. 50%) is distributed to the registrant of the selected idea 50. A second portion 110 of the royalties that is smaller than the first portion (e.g. 25%) is distributed equally amongst the remaining registrants 16 within the pool 10. A third portion 120 of the royalties that is also smaller than the first portion (e.g. 25%) is distributed to the pool manager 40 as a commission.

Accordingly, it can be seen that the method according to the present invention provides for the selection and development of a new product having the greatest potential for market success relative to a pool of related new product ideas.

It is understood that while certain forms of this invention have been illustrated and described, it is not limited thereto except insofar as such limitations are included in the following claims and allowable functional equivalents thereof.

Having thus described the invention, what is claimed as new and desired to be secured by Letters Patent is as follows:

1. An automated method for developing new products, comprising the steps of:
   providing a plurality of pools, each pool associated with a predetermined subject matter and administered by a pool manager;
   receiving electronically, using a computer data processing system accessible through a wide area network, a predetermined number of new product concepts into each said pool, each said new product concept being registered by a submitter to one of said pools having a subject matter in common with the subject matter of said new product concept;
   selecting a single new product concept from each pool for market introduction once said predetermined number of new product concepts has been received into said each pool;
   wherein said step of selecting a single new product concept further includes the steps of:
     analyzing each new product concept received into one of said pools relative to marketability;
     analyzing each new product concept received into one of said pools relative to patentability;
     analyzing each new product concept received into one of said pools relative to technical feasibility;
   transforming each said selected new product concept into a developed new product suitable for introduction to the marketplace; and
   licensing each said developed new product to a manufacturer for manufacture, distribution, and sale in a market mutually selected by said pool manager and said manufacturer, each said license providing a source for royalties, the royalties providing a source for making payment of a first portion of said royalties to the submitter of said selected new product concept and for making payment of a second portion of said royalties smaller than said first portion of said royalties in equal amounts to the submitters of each new product concept not selected and for making payment of a third portion of said royalties smaller than said first portion of said royalties payable to said pool manager.

2. The method as in claim 1 wherein said step of transforming the selected new product concept into a developed new product includes the steps of:
   engineering each said selected new product concept to optimize the utility function thereof through application of innovative design methodology; and
   obtaining a degree of proprietary protection for each said selected new product concept by filing and prosecuting at least one patent application covering the novel elements of each said selected new product concept.

3. The method as in claim 2 wherein said step of receiving said new product concepts into said pools includes the step of requiring payment of a registration fee for each new product concept registered by a submitter, said registration fees being used to fund said steps of engineering each said selected new product concept and obtaining a degree of proprietary protection for each said selected new product concept.

4. The method as in claim 1 wherein said step of receiving said new product concepts into said pools includes the step of requiring payment of a registration fee for each new product concept registered by a submitter, the registration fee being dependent upon the subject matter associated with the pool into which a new product concept is registered.

5. The method as in claim 1 further comprising the step of combining two or more pools into a single pool if a predetermined number of new product concepts are not received into a single pool within a predetermined period of time.

6. The method as in claim 1 further comprising the step of notifying said new product concept submitters associated with each pool when one new product concept has been selected from said pool and identifying said selected new product concept.

\* \* \* \* \*